March 9, 1965 H. E. KUNSCH, JR 3,173,022

OVERLOAD PROTECTED SWITCHING CIRCUIT

Filed June 14, 1961 4 Sheets-Sheet 1

INVENTOR.
HAROLD E. KUNSCH JR.

BY Allan Rothenberg

ATTORNEY

March 9, 1965 H. E. KUNSCH, JR 3,173,022

OVERLOAD PROTECTED SWITCHING CIRCUIT

Filed June 14, 1961 4 Sheets-Sheet 2

INVENTOR.
HAROLD E. KUNSCH JR.

BY Allan Rothenberg

ATTORNEY

March 9, 1965 H. E. KUNSCH, JR 3,173,022

OVERLOAD PROTECTED SWITCHING CIRCUIT

Filed June 14, 1961 4 Sheets-Sheet 3

*INVENTOR.*
HAROLD E. KUNSCH JR.
*BY* Allan Rothenberg
ATTORNEY

INVENTOR.
HAROLD E. KUNSCH JR.
BY Allen Rothenberg
ATTORNEY

United States Patent Office 3,173,022
Patented Mar. 9, 1965

3,173,022

OVERLOAD PROTECTED SWITCHING CIRCUIT

Harold E. Kunsch, Jr., Buena Park, Calif., assignor to North American Aviation, Inc.

Filed June 14, 1961, Ser. No. 117,022
9 Claims. (Cl. 307—88.5)

This invention relates to transistorized switching circuits and more particularly to overload protected switching circuits especially adaptable for use in transistorized bridge-type switching amplifiers.

The electromechanical and electronic equipment of modern aircraft and missiles require on-board sources of several types of electrical power. However, restrictions on available space and allowable weight for such power sources for such vehicles results in the anomolous requirement of a diversity of types of electrical power sources of large capacity and having minimum weight and space.

One approach to the problem of providing both D.-C. and A.-C. types of electrical power sources having minimum weight and space requirements has been the use of D.-C. power supplies in cooperation with bridge-type switching amplifiers. Such bridge-type switching amplifiers may be operated by an extremely low power A.-C. signal source to provide an A.-C. modulated power output from the D.-C. power source and having a frequency equal to that of the A.-C. signal source. In such an arrangement each of a plurality of such switching amplifiers may be operated by one line of a polyphase high impedance signal source to provide a low impedance polyphase power source.

In practice, such bridge-type switching amplifiers are transistorized, and characteristically embody a plurality of bi-directional switching devices. The use of transistors provides an inherent disadvantage of susceptability to failure from overloads or short circuits. For example, if the output of a bridge-type switching amplifier is shorted either to ground or to the direct current source, one of the power transistors in the bridge circuit of the switching amplifier would be connected directly across the direct current source and ground. When such transistor is turned on under such circumstances, it will pass excessive current and be destroyed unless some protective device is incorporated into the circuit.

The present invention will be described herein in a form particularly adapted to provide protection of bridge-type transistor switching circuits from excessive load currents.

The most obvious solution to the prevention of excessive current is the use of a fuse which will open the line to the output bridge if excessive currents flow. The disadvantages of this method are that unless a special "fast blow" fuse is used, the transistor will be destroyed before the fuse element melts, and after the overload is removed the fuse must be replaced to restore normal operation.

Another method that may be used for overload protection of bi-directional switching devices is to place a resistor in series with the source of D.-C. potential to limit the current to a safe value in the event of a short circuit. The disadvantages are: (*a*) the equivalent source impedance seen by the output bridge increases and thus the output impedance of the amplifier also increases, (*b*) the available output voltage from the amplifier for a given value of D.-C. source potential is reduced, and (*c*) a large amount of non-useful power is dissipated in the series resistor. The advantage is that when the overload is removed normal operation occurs.

A current limiting device employing an active circuit element such as a zener diode in shunt with a series combination of switching element and current limiting resistor may be used to prevent excessive currents. Under normal operation of such a circuit, the zener diode does not conduct to shunt excessive load current, because the voltage drop across the switch and resistor combination is less than the zener breakdown voltage. If a short occurs the current increases through the switch means and resistor to achieve a voltage drop exceeding the zener breakdown voltage. Hence, the zener diode will begin to conduct and thus limits the current through the switch. The disadvantages are: (*a*) the resistor increases the output impedance of the power source, (*b*) the D.-C. voltage at the bridge is reduced, (*c*) power is dissipated in the series resistor, and (*d*) during short circuit conditions the series transistor must dissipate considerable power and thus must be of large size. The advantages are that it has less adverse effect upon the amplifier characteristics than the series resistor alone and the circuit returns to normal operation when the overload is removed. Desirably, a preferred overload protection device would employ the advantages of such an arrangement while avoiding the effect of its disadvantages.

Accordingly, a general object of this invention is to provide improved bi-directional switching circuits including means for providing overload protection.

In carrying out the principles of this invention in accordance with a preferred embodiment thereof, there is provided a driven bi-directional D.-C. switch, an improved A.-C. controlled driving circuit for driving said driven switch, including unique transformer coupling between said driving circuit and said driven switch for cutting off said switch in the presence of overload currents, and means including said driving circuit and coupling for limiting said overload currents. Fundamentally, a switch is connected in circuit with a potential source and the load for controlling current flow from the source to the load. The switch is protected against overload currents by a novel control arrangement which includes control means providing a current path to the load and means responsive to current flow through such path to the load for controlling the switch. Accordingly, if the load should be shorted to B+ or ground, the increased current through the path including the control means is effective to open the switch and prevent damage thereto due to excess currents.

An object of this invention, therefore, is to provide an improved source of polyphase A.-C. power employing D.-C. bridge-type switching amplifiers.

Another object of this invention is to provide electronic switching means having improved overload protection.

Yet another object of this invention is to provide improved polyphase bridge-type switching amplifiers having improved protective features against overloads.

Still another object of this invention is to provide improved transistor switching means.

Still a further object is to provide improved overload protection of transistor switches by high speed response means having minimum power dissipation.

Another object of this invention is to provide improved overload protection for transistor switches without increase in the switch output impedance during normal switch operation.

These and other objects of the invention will become apparent from the following description taken in connection with the accompanying drawings in which.

In the drawings, like reference characters refer to like parts.

Figure 1:
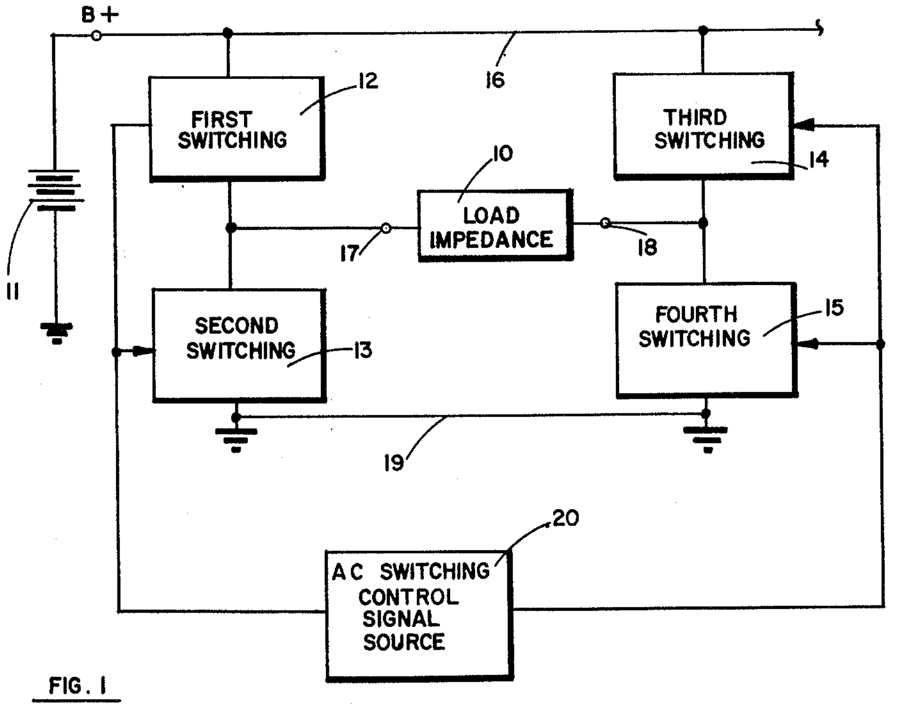
FIG. 1 is a functional block diagram of a bridge-type bi-directional switching circuit.

Referring to FIG. 1 there is illustrated a block diagram of a conventional bridge type switching circuit adapted for bi-directional current switching through a load 10, to provide single-phase A.-C. power. There is provided a D.-C. power source 11, and first, second, third and fourth switches 12, 13, 14 and 15, arranged for connecting the load impedance 10 across D.-C. power source 11. First switch 12 is interposed in series circuit between a first line 16 of the D.-C. power source and a first terminal 17 of load 10, while fourth switch 15 is interposed in series circuit between a second terminal 18 of load 10 and the other line 19 of D.-C. power source 11, to provide means for passing an electrical current in a first direction through load impedance 10.

Third switch 14 is interposed in series circuit between line 16 of the D.-C. power source and second terminal 18 of load 10, while second switch 13 is interposed in series circuit between line 19 and terminal 17 to provide means for passing an electrical current in a second direction opposed to that provided by first and fourth switches 12 and 15.

An A.-C. switching control signal source 20 is operatively connected to switches 12, 13, 14, 15 for alternately opening and closing such switches at a switching speed determined by the signal source frequency. A first pair of switches 12 and 15 are arranged to open and close together, and a second pair of switches 13 and 14 are arranged to open and close together. However, each of such pairs of switches is arranged to open when the other is closed, and to close when the other opens. Thus, the four switches cooperate to provide a cyclically bi-directional or A.-C. current through load 10 from D.-C. power source 11.

The use of a plurality of pairs of such switches, each pair driven by a different phase of a polyphase signal, may be applied to a polyphase load to provide a source of polyphase power for such load.

Figure 2:
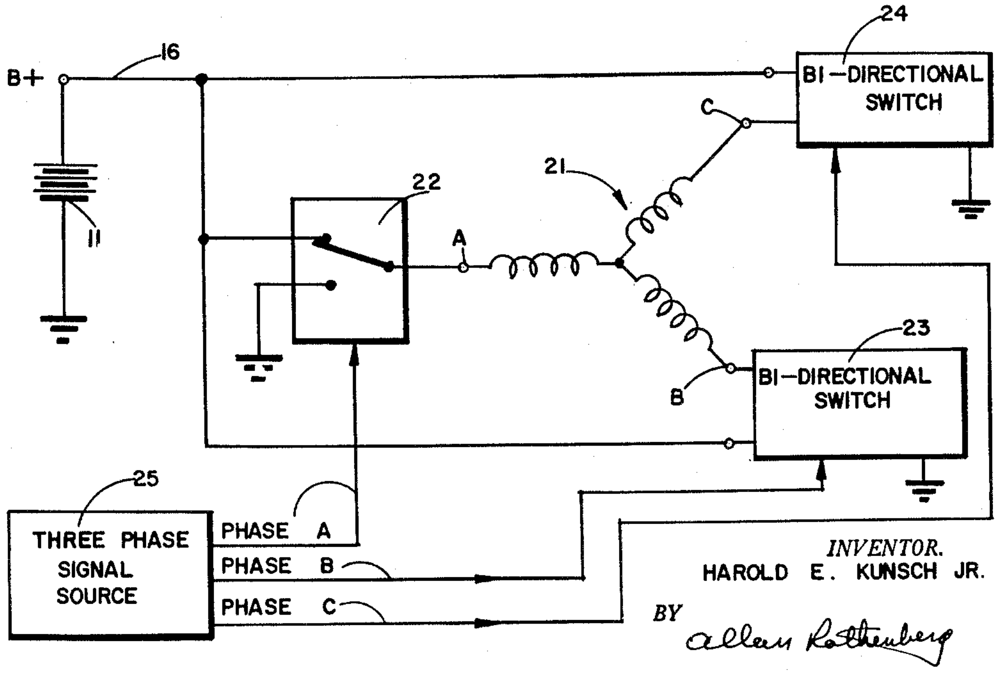
FIG. 2 is a block diagram of a polyphase power means employing the bi-directional switching device of FIG. 1.

Referring to FIG. 2, there is illustrated a primary winding 21 of a three-phase transformer, representing a load impedance, and having phase terminals A, B, and C. A first, second, and third bi-directional switch 22, 23, and 24 is interposed between a D.-C. power source 11 and terminals A, B, and C respectively, for connecting such terminals alternately to either polarity of D.-C. power source 11. Phases A, B, and C of a three-phase control signal source 25 are operatively connected to bi-directional switches 22, 23, and 24 respectively for synchronously connecting each of terminals A, B, and C to each side of D.-C. power source 11, so as to provide polyphase A.-C. power through load 21 from D.-C. power source 11. In the device illustrated in FIG. 2, each of switches 22, 23, and 24 correspond to the combination of elements 12 and 13 or of elements 14 and 15 of FIG. 1. For example, when conduction occurs through load 21 from terminals A to B (corresponding to terminals 17 and 18 of load 10 in FIG. 1), element 22 of FIG. 2 corresponds to the combination of elements 12 and 13 of FIG. 1, with element 12 being closed; while element 23 of FIG. 2 corresponds to the combination of elements 14 and 15 of FIG. 1, with element 15 being closed. Such condition of conduction occurs when oppositely poled switching half-cycles of phase A and phase B of signal source 25 are coincident in time.

Practical limitations arise in mechanizing the switching means of FIG. 2 by the use of transistor circuits, in that protection of such transistor switches is required from line-to-line shorts (e.g., short circuits between terminals A and B, of element 21, for example (and line-to-B+ shorts and line-to-ground shorts. Also, the required protective means should not make the device completely inoperative in the event of overloads, but preferably should limit the overload current and also automaically restore the device to full operability upon the cessation of a temporary overload or short-circuit condition. Further, overload protection is required from short circuits across D.-C. supply source 11 through both of switching elements 12 and 13 of FIG. 1, for example, due to switch transients and resulting in the destruction of elements 12 and 13. Such a switching circuit providing such protective means is illustrated in FIG. 3 in an arrangement for driving a three phase load.

Figure 3:
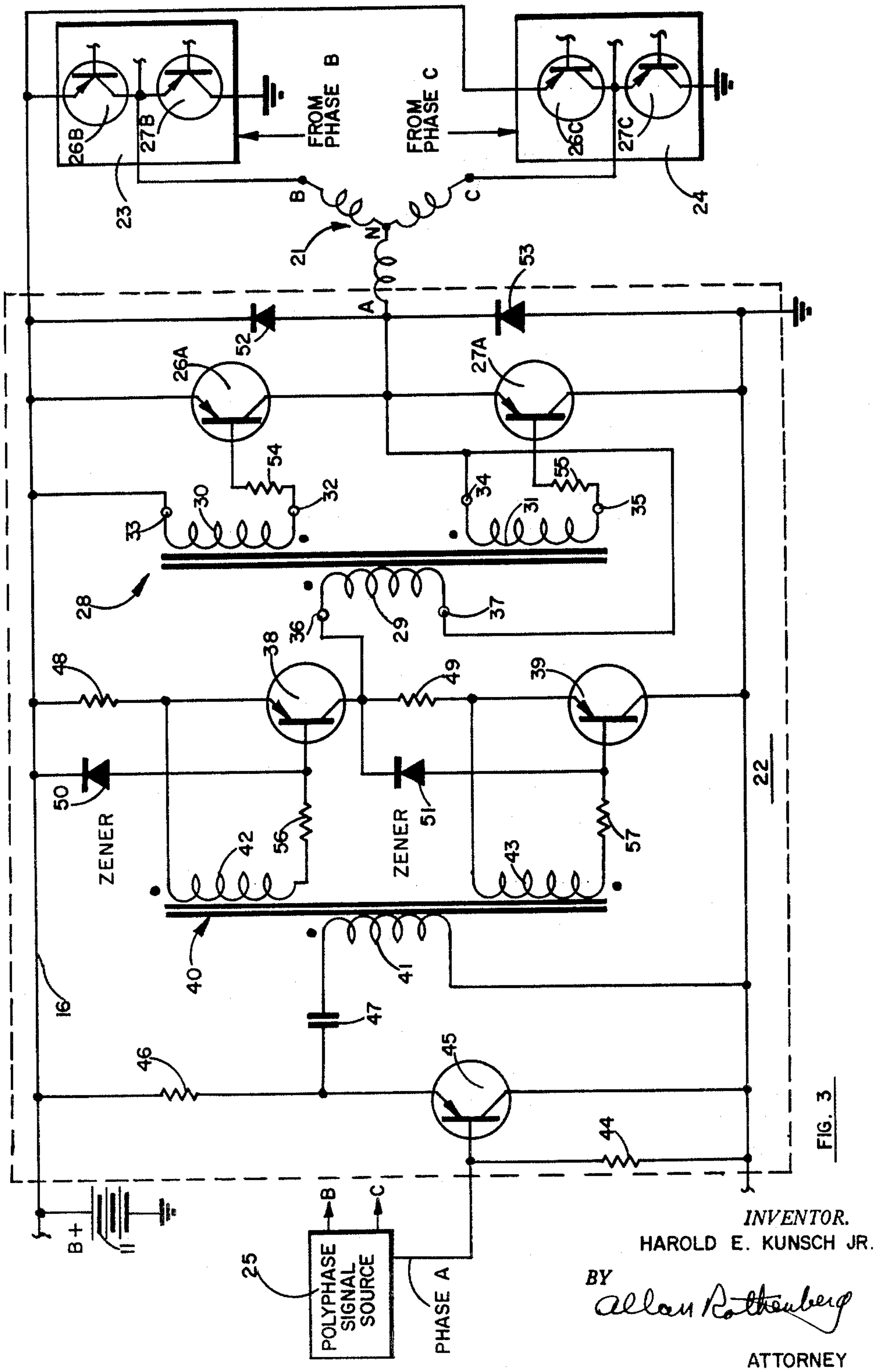
FIG. 3 is a diagram, partially schematic and partially block, of a preferred embodiment of the device of this invention, as applied to the device of FIG. 2.

Referring to FIG. 3, there is illustrated a schematic diagram of a preferred embodiment of the invention as applied to the device of FIG. 2. There is provided a polyphase winding 21 representing the primary winding of a polyphase transformer or other load impedance, and having phase terminals A, B and C. There is also provided a D.-C. potential source 11 and a polyphase signal source 25 having its three output phases A, B and C fed to a first, second and third bi-directional switching means 22, 23, and 24, respectively, which are connected between D.-C. potential source 11 and load terminals A, B and C respectively. Connection of the bi-directional switches for each phase of element 21 responsively to a corresponding phase of the polyphase control signal source 25 provides synchronous operation of the three bi-directional switches.

While only the bi-directional switch for terminal A of load 21 is illustrated in detail, it is understood that each of switching means 22, 23 and 24 are comprised of like components similarly arranged for connecting the corresponding terminals of element 21 to the D.-C. potential source. Accordingly, elements 23 and 24 are represented by functional blocks only.

The bi-directional switch means for phase A of the load is comprised of first and second switches in the form of output transistors 26 and 27 arranged for connecting terminal A to the positive and negative side respectively of D.-C. source 11. Protection of switching transistors 26 and 27 is achieved by the novel arrangement of control means comprising a transformer 28 having its primary winding 29 connected to provide a current path to the load through the connection of winding terminal 37 to load terminal A.

Coupling transformer 28 is provided for coupling a drive circuit to the control electrodes of output transistors in push-pull arrangement. Transformer 28 is comprised of a two-terminal primary winding 29 and first and second two-terminal windings 30 and 31. A reference polarity terminal 32 and second terminal 33 of the first secondary winding 30 are connected to the control electrode of first output transistor 26 and to the positive side of D.-C. potential 11, respectively. The reference polarity terminal 34 and second terminal 35 of the second secondary winding 31 are connected to the emitter electrode and the control electrode respectively of second output transistor 27.

The reference polarity terminal 36 of primary winding 29 is responsively connected to a switch drive means for alternately raising and lowering the potential of terminal 36 toward the positive and negative terminal potentials respectively of D.-C. potential 11. A second terminal 37 of primary winding 29 is connected to terminal A of the load impedance.

The drive means may be comprised of any suitable means for raising and lowering the potential of terminal 36 in response to a control signal. For example, the embodiment of FIG. 3 illustrates a drive circuit which operates in response to phase A of the three-phase square wave control signal, and comprises first and second drive transistors 38 and 39 arranged for raising and lowering respectively the potential of terminal 36 of transformer 28 with respect to D.-C. potential of source 11. The control electrodes of drive transistors 38 and 39 are coupled in push-pull arrangement to operate the two drive transistors alternately in response to the square wave control signal.

Drive transistors 38 and 39 are controlled such that base current is drawn from transistor 38 for one half cycle of the control signal, so as to saturate transistor 38 while cutting-off transistor 39; and then this condition is reversed on the next half cycle, so that transistor 38 is cut-off and transistor 39 is saturated. Any type of control which accomplishes this function is satisfactory. For example, in the embodiment illustrated in FIG. 3, the control electrodes of transistors 38 and 39 are coupled to phase A of the control signal by means of a single transistor amplifier stage driving an input transformer 40, having a two terminal primary winding 41 and first and second two-terminal secondary windings 42 and 43. The control signal potential is applied across input resistor 44 which is also connected across the control and collector electrodes of input transistor 45. The emitter-collector path of transistor 45, is operatively connected across the D.-C. potential source, with output resistor 46 interposed in series between the positive terminal of D.-C. potential 11 and the emitter electrode of input transistor 45. Signals or potential changes across resistor 46 are coupled to the primary winding 41 of transformer 40 by means of coupling capacitor 47, to prevent D.-C. coupling or saturation of primary winding 41.

Current limiting means for short circuit operation of the load is incorporated in the drive circuit of FIG. 3 by means of first and second current limit resistors 48 and 49 and first and second zener diodes 50 and 51. First current limiting resistor 48 is interposed in series between the emitter electrode of first drive transistor 38 and the positive terminal of D.C. potential 11, and first zener diode 50 is connected in a forward conducting direction from the control electrode of transistor 38 to the positive terminal D.-C. potential 11. This combination provides current limiting through transistor 38 when the potential drop across resistor 48 reaches the zener breakdown voltage of diode 50. Similarly, second current limiting resistor 49 is interposed in series circuit between primary terminal 36 of transformer 28 and the emitter electrode of second drive transistor 39, and second zener diode 51 is connected in a forward conducting direction from the control electrode of transistor 39 to terminal 36, to provide a like current limiting function for second drive transistor 39.

Also provided are first and second crystal diodes 52 and 53 connected across load terminal A and the positive and negative terminals, respectively, of D.-C. source 11, first crystal diode 52 being connected in a forward conducting direction from load terminal A to the positive terminal of D.-C. source 11, and second crystal diode 53 being connected in a forward conducting direction from the negative terminal of D.-C. source 11 to load terminal A. The purpose of elements 52 and 53 is to provide means for reverse current flow in each leg of the bridge circuit. Such a function is required, for example, when a reactive load impedance is feeding power back into the D.-C. line.

For good design practice, output transistors 26 and 27 are selected to have a current rating compatible with the load requirements, and coupling transformer 28 has a stepdown ratio of about 10:1. First and second base current resistors 54 and 55 are inserted in series with the control electrode circuit of output transistors 26 and 27 respectively to permit a base current during the "ON" time of each of those transistors which will keep it saturated. Drive transistors 38 and 39 are rated to handle a current having a magnitude equal to the base current of switching transistors 26 and 27 divided by the turns ratio of element 28 plus the excitation current of element 28.

CIRCUIT OPERATION UNDER NORMAL OPERATION (NO OVERLOAD)

Assume that the D.-C. source 11 has been connected but there is no input square wave signal. There can be no signal at the bases of transistors 38 or 39 since capacitor 47 will block D.-C. This means that transistors 38 and 39 have their bases and emitters connected together through a low impedance path of resistor 56 or 57 respectively and the associated secondary winding 42 or 43 respectively of transformer 40. Thus, only a small leakage current will be flowing from B+ through resistor 48, transistor 38, resistor 49 and transistor 39. Terminal 36 of transformer 28 will be at some potential between the positive terminal of source 11 and ground which will be determined by the individual leakage characteristic of the transistors. Since transformer 28 will not couple a D.-C. level, there is no drive to the bases of transistors 26 or 27. Therefore, transistors 26 and 27 also are conducting a small leakage current. The actual voltage levels at this time are determined by transistors 26, 27, 38, and 39 in each of the three power amplifiers 22, 23, and 24 plus the D.-C. characteristic of element 10 and the drive transformer 28 in each power amplifier.

Now assume that an input signal is applied such that base current is drawn from transistor 38, and that transistor 39 is cut off. With transistor 38 saturated, the voltage at terminal 36 of transformer 28 will go positive toward B+ making terminal 32 positive with respect to terminal 33, and making terminal 34 positive with respect to terminal 35. These voltages at the secondary terminals then drive transistor 26 slightly into cutoff, and slightly forward bias transistor 27 so that it will conduct more current. This in turn causes the voltage at terminal 37 of transformer 28 to go in the negative direction toward ground. Thus the voltage across primary terminals 36 and 37 of transformer 28 increases, which drives transistor 26 further into cutoff and transistor 27 further into saturation. This action is cumulative and ends with a voltage across primary terminals 36 and 37 of transformer 28 being B+ minus the drop across resistor 48 and transistors 38 and 27, both of which are saturated. The drive voltage to transistor 27 is this primary voltage of transformer 28 divided by the stepdown ratio. The value of resistor 55 is selected to provide a base current which drives 27 well into saturation. The circuit remains in this condition until the next half cycle. During normal operation the voltage across resistor 48 or 49 is never great enough to cause breakdown of zener diode 50 or 51 respectively.

When the input signal changes, transistor 38 is cut off and base current is drawn from transistor 39 so that it is capable of conducting. Because a transistor cannot switch from the conducting state to the cutoff state instantaneously, the transient of switching must be taken into consideration. The transient relation between base drive and collector current is shown in FIG. 4.

Figure 4:
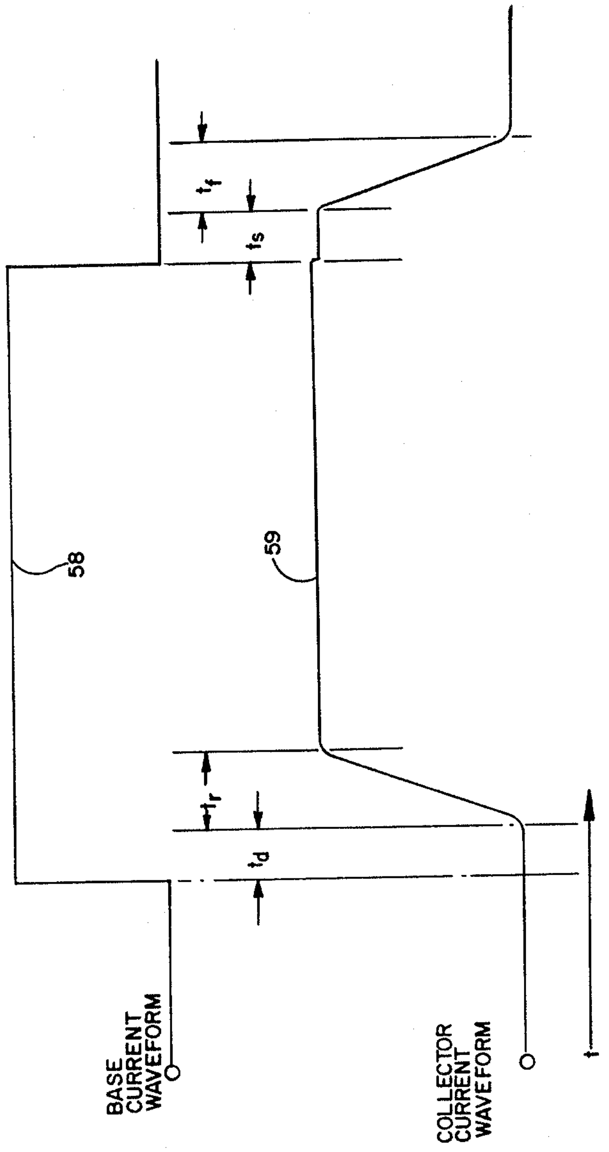
FIG. 4 is a representative time history illustrating the collector current wave form transients associated with an arbitrary base current waveform for a transistor device.

Referring to FIG. 4, there is illustrated a representative time-history of a base current wave form 58 and the corresponding collector wave form 59 associated therewith for a transistor device. A square-wave type wave form has been depicted for the base current because (1) it more clearly displays the nature of the starting and stopping transients of the collector current response and (2) a square-wave control signal is employed in the exemplary device of FIG. 3. Hence, the starting transient is seen to comprise a delay time or interval of deadtime $t_d$ and an interval of rise time $t_r$. Similarly, the stopping transient is seen to comprise an interval of storage time $t_s$ and an interval of fall time $t_f$. In most transistors the stoping transient interval exceeds the starting transient interval. This phenomenon is significant to bi-directional transistor switching devices such as the device of FIG. 3 for the reason that both of transistors 26 and 27 might be caused to conduct simultaneously, resulting in a short circuit across the D.-C. supply 11.

Since the output transistor circuit of FIG. 3 does not detect any change until there is a change in the collector current of the drive transistor, the actual output circuit response to the control signal input will inherently display the further transient effect of a drive transistor. However, for purposes of convenience in exposition, it will be assumed that the drive transistors switch instantaneously. Thus, when drive transistors 38 and 39 switch for example (element 38 turns off and element 39 begins to conduct), the voltage at terminal 36 of transformer 28 goes from approximately B+ to approximately ground potential. During the storage time $t_s$ of transistor 27, there is essentially no change in its collector current, so terminal 37 of transformer 28 remains at near ground potential where it was during the preceding half cycle. The voltage across the primary of transformer 28 is essentially zero during this time, so transistor 27 no longer receives any drive and transistor 26 now has zero voltage applied between its base and emitter.

At the end of the storage time of transistor 27, the collector currents starts decreasing and the voltage at terminal 37 of transformer 28 goes positive. As terminal 37 goes positive with respect to terminal 36, there is a back-bias applied to transistor 27 which completely cuts it off. At the same time, transistor 26 is forward biased thereby permitting element 26 to conduct. As transistor 26 begins to conduct, the voltage at terminal 37 of transformer 28 goes toward B+, which further cuts off element 27 and permits element 26 to conduct more. This action is cumulative and ends with essentially B+ across the primary of transformer 28, transistor 26 well-saturated, and transistor 27 cut-off.

When the input signal next changes, the reverse switching of the output stage is similar in theory to that described above. Thus it can be seen that the "turn on" of the output transistor which had been off is delayed until the storage time of the transistor which had been on is completed. This greatly reduces the time during which both transistors are conducting and thus greatly reduces the high peak instantaneous power dissipated by the output transistor during the switching transient.

CIRCUIT OPERATION UNDER SHORT CIRCUIT CONDITION

A. *Line to ground short circuit*

If the load terminal A, B, or C connected to switches 22, 23 or 24, respectively, is shorted to ground, the emitter and collector of transistor 27A (or its counterpart in switches 23 and 24) are connected together and there is no possibility of damaging it, but transistor 26A (or its counterpart) is connected directly across the D.-C. source and would be quickly destroyed if it were turned on. In accordance with the principles of this invention the drive for this transistor is arranged so that the transistor is turned off upon occurrence of line to ground short.

With a line to ground short, terminal 37 of transformer 28 will be at ground potential at all times. Since the voltage at terminal 36 can only vary between B+ and ground, it will be impossible for terminal 37 to be positive with respect to terminal 36. Thus, the base of transistor 26A will never go negative with respect to the emitter, and this transistor will never be turned on. If the short circuit should occur during the time when transistor 26 is conducting, the drive to transistor 26 will be immediately removed because the voltage across the primary of transistor 28 will immediately go to zero. As soon as the short circuit is removed, the circuit will resume normal operation.

During the time the short circuit condition exists, the current through the primary of transformer 28 will be unidirectional. In this case the current will flow through resistor 48, transistor 38, and the primary winding 29 of transformer 28 to ground. This will result in the core of transformer 28 being saturated, which would normally cause a destructively large current through transistor 38. However, as this current increases above its normal value the voltage drop across resistor 48 increases until the zener breakdown voltage of zener diode 50 is exceeded. When this occurs, the base-to-emitter bias of transistor 38 is clamped, and the transistor (which, up to this time, was saturated) becomes a constant current device. Transistor 38 must have a power rating compatible with expected power dissipation during short circuit operation.

B. *Line to B+ short circuit*

If the output terminal A, B, or C of switch 22, 23 or 24, respectively, is shorted to B+, the emitter and collector of transistor 26A (or its counterpart in elements 23 or 24) are connected together and there is no possibility of damaging it, but transistor 27A (or its counterpart) is connected directly across the D.-C. source and would be quickly destroyed if it were turned on. The arrangement of circuitry according to the concepts of this invention also provides protection for this condition.

In the event of a line to B+ short, terminal 37 of transformer 28 will be at B+ potential and since terminal 36 can only vary from B+ to ground, it will be impossible for terminal 36 to be positive with respect to terminal 37. This means that the base of transistor 27A can never be driven negative with respect to the emitter and this transistor cannot be turned on. If the short circuit should occur while transistor 27A is conducting, the drive to this transistor would immediately be removed since the voltage across primary 29 of transformer 28 goes immediately to zero. As soon as the short circuit is removed the circuit will resume normal operation.

During the time the short circuit condition exists there is a unidirectional current through the primary of transformer 28 which causes the core to saturate. In this case, excessive exciting currents are prevented by the current limiting action of resistor 49 and zener diode 51 in conjunction with transistor 39. The operation of the current limiter is the same as that described for elements 38, 48 and 50.

C. *Line to line short circuit*

In the event of a line to line short a condition exists where there would be a current path from B+, through an output transistor 26 in one of switches 22, 23, 24 through the short circuit, through an output transistor 27 in another of switches 22, 23, 24 to ground. Without a protective circuit this would result in at least one of these transistors coming out of saturation and being destructively heated.

Figure 5:
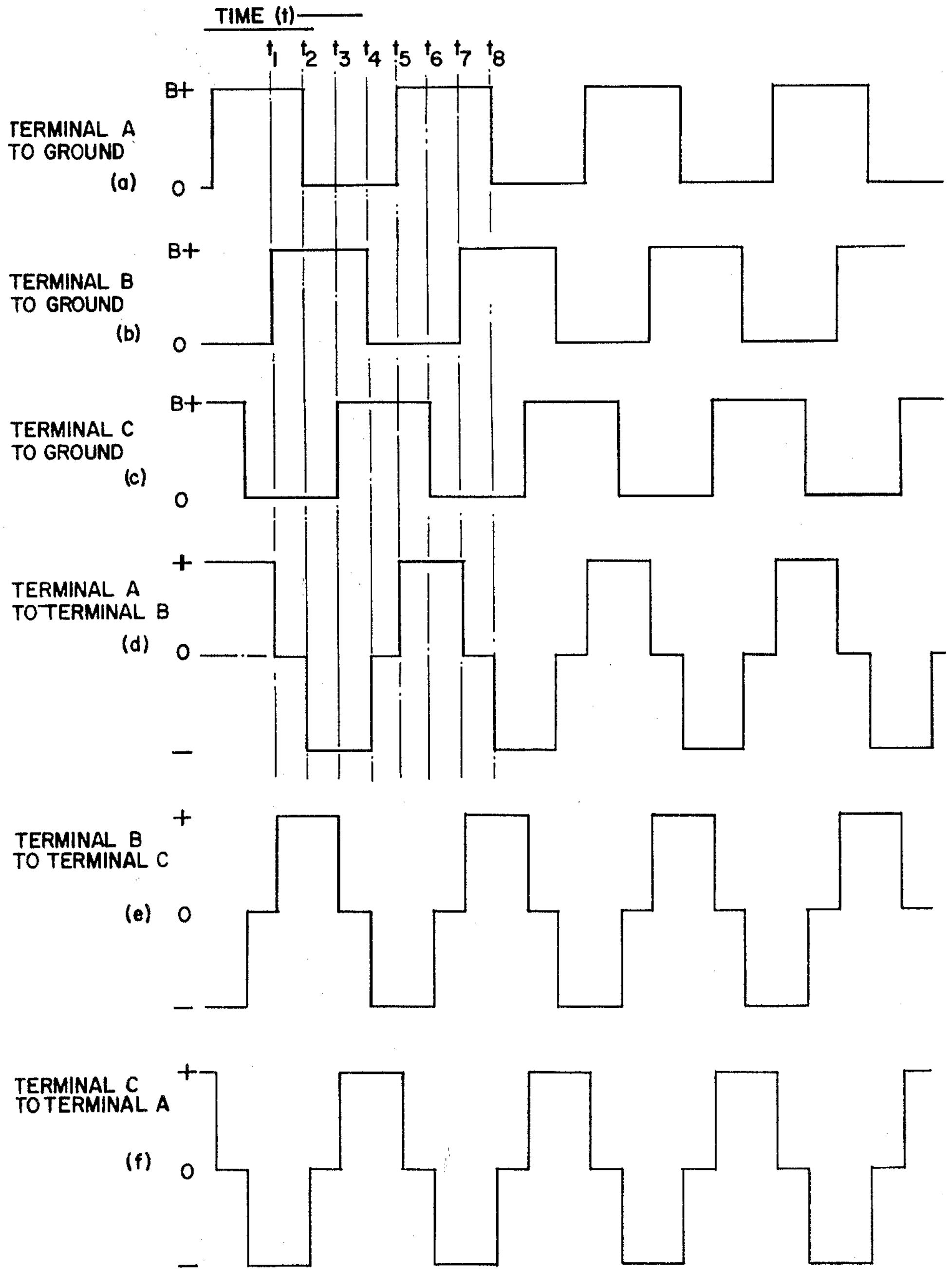
FIG. 5 is a time history illustrating the voltage waveforms which describe the polyphase operation of the device of FIG. 3.

The protective circuit will protect against any line to line short circuit. As an example, consider phases A and B of load 10 of FIG. 1 to be shorted together. The voltage waveforms describing the polyphase operation of the device of FIG. 3 are shown in FIG. 5. Denoting the elements for the switching amplifier for any one of phases A, B and C of load impedance 10 of FIG. 3 by a corresponding letter notation, it is to be seen that during one sixth of any cycle (for example, from $t_1$ to $t_2$) both transistors 26A and 26B will be conducting (ON) (e.g., terminal A is (+) in FIG. 5(*a*) and terminal B is (+) in FIG. 5(*b*), respectively) so there will be no current through the short circuit path (FIG. 5(*a*)). Likewise there will be one sixth of a cycle (for example, from $t_4$ to $t_5$) during which both transistors 27A and 27B will be on (e.g., terminal A in FIG. 5(*a*) and terminal B in FIG. 5(*b*) are at zero), so again there will be no current in the short circuit path (FIG. 5(*d*)). However, there will be one third of a cycle (for example, from $t_5$ to $t_6$) when transistor 26A (FIG. 5(*a*)) and 27B (FIG. 5(*b*)) would normally be on, and one third of a cycle (for example, from $t_3$ to $t_4$) when transistors 26B and 27A would normally be on. In each of these last two cases destructive current could flow through the short circuit (FIG. 5(*d*)) if there were no overload protection.

Consider first the case ($t_4$ to $t_5$) where transistors 27A and 27B are both on (e.g., terminal A is (+) in FIG. 5(*a*) and terminal B is zero in (FIG. 5(*b*)), respectively and there is no current in the short circuit path (FIG. 5(*d*)). Within one sixth (e.g., at $t_5$) of a cycle transistor 27A turns off and transistor 26A will try to turn on. This means that the output terminal A of amplifier 22 would normally go positive (FIG. 5(*a*)) because transistor 27A is turned off, but, because of the short circuit path and the fact that transistor 27B (FIG. 5(*b*)) remains in the conductive state (e.g., terminal B is at ground potential) the output of amplifier 22 is prevented from going positive. Terminal 37 of transformer 28A is held at approximately ground potential and, as shown for the case of a line-to-ground short, this prevents transistor 26A from being turned on, since a relatively positive potential at terminal 37 is required to provide base current to transistor 26A of proper polarity for turning on transistor 26A.

One third of a cycle later ($t_7$) transistor 27B will be turned off and this will result in the output of both amplifier 22 and 23 going to approximately B+ (e.g., terminal A is (+) in FIG. 5(*a*) and terminal 3 is (+) in FIG. 5(*b*)). Since both transistors 26A and 27B will be saturated, no short circuit current will flow (FIG. 5(*d*)).

One sixth of a cycle later (at $t_8$) amplifier 22 will try to turn off transistor 26A and to turn on transistor 27A (e.g., terminal A is at zero potential in FIG. 5(*a*)). This would normally be accomplished by having the output voltage of amplifier 22, and thus terminal 37 of transformer 28A, go in the negative direction as transistor 26A comes out of conduction. However, because of the short circuit path, and the fact that transistor 26B continues to conduct, terminal 37 of transformer 28A will be kept at essentially B+. As shown for the case of a line to B+ short this prevents transistor 27A from being turned on.

One third of a cycle later transistor 26B will be turned off and this will result in both transistors 27A and 27B being saturated, but no current will flow in the short circuit path. This action then repeats until the short is removed at which time normal operation is resumed.

As can be seen from the above description there is never a period when there is a current path from B+ to ground through two conducting transistors. If the line to line short occurs during a period when there is such a path for short circuit current to flow, one of the conducting transistors will immediately come out of saturation which will result in a voltage drop across this transistor. This will reduce the primary voltage of the transformer which is driving this transistor which reduces the drive which pulls the transistor further out of saturation which further decreases the drive. This is a cumulative action ending with one of the transistors in the short circuit path being cut off.

It will be seen that the device of this invention provides improved means for achieving overload protection of a bridge-type switching amplifier.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A switching circuit comprising: a load; means for providing first and second oppositely directed current paths through said load, said paths including first and second switches connected to one side of said load; means for opening and closing said switches alternately, means for limiting current flow through at least one of said switches during periods of shifting of said switches between their open and closed conditions, and means responsive to current flow through said load for controlling the flow of current through said load.

2. A switching circuit comprising: a load; means for providing first and second oppositely directed current paths through said load, said paths including first and second switches connected to one side of said load; control means for opening and closing said switches alternately; means including said control means for limiting current flow through at least one of said switches during periods of shifting of said switches between their open and closed conditions; means for opening said switches during intervals in which load currents exceed a predetermined limit and operatively re-closing said switches when said load currents drop below said limit; and means independent of said switches responsive to current flow through the load for limiting the flow of current through the load.

3. A switching circuit comprising: a load; means for providing first and second oppositely directed current paths through said load, said paths including first and second switches connected to one side of said load; first means for opening and closing said first and second switches alternately; first limiting means for limiting current flow through at least one of said switches during periods of shifting of said switches between their open and closed conditions; said paths further including third and fourth switches connected to another terminal of said load impedance, second means for opening and closing said third and fourth switches alternately, and second limiting means for limiting current flow through at least one of said third and fourth switches during periods of shifting said third and fourth switches between their open and closed conditions; and means for opening said switches during an interval in which load currents exceed a predetermined limit and operatively re-closing said switches when said load currents drop below said limit; and means independent of said switches responsive to current flow through the load for limiting the flow of current through the load.

4. A polyphase bridge type electronic switching amplifier having over-load protection and comprising: a polyphase signal source; a two-terminal source of D.-C. potential; a polyphase-type load impedance having a terminal connection for each phase corresponding to a like phase of said polyphase signal source; a plurality of bidirectional switch means, each individual to a different terminal of said polyphase load impedance; each said switch means comprising a first and second switch for connecting the polyphase terminal individual thereto to a first and second terminal respectively of said D.-C. potential source, drive means responsive to the corresponding phase of said polyphase signal source for opening and closing said switches alternately, control means for limiting current flow through at least one of said switches during periods of shifting of said switches between their open and closed conditions, means including said control means responsive to current flow through said load in excess of a predetermined amount for opening said switches during the interval in which a load current through such phase exceeds such predetermined amount and operatively closing such switches when said load current drops below such amount, and means of said switches and including said control means for limiting the flow of current through the load.

5. An electrical control circuit for delivering electrical energy to one terminal of a multiphase A.-C. load from a D.-C. source comprising: first and second D.-C. input terminals adapted to be connected, respectively, to the positive and negative terminals of a D.-C. source; a timing input terminal, adapted to be connected to one output terminal of a polyphase signal source; an output terminal, adapted to be connected to one terminal of a polyphase load; a first output transistor, including a control electrode, having one of an emitter and collector electrodes connected to said first input terminal and the other of said emitter and collector electrodes connected to said output terminal; a second output transistor, including a control electrode, having one of an emitter and collector electrodes connected to said output terminal and the other of said last named emitter and collector electrodes connected to said second input terminal; drive means, connected to be driven by signals supplied to said timing input terminal; transformer coupling means connected to couple said drive means to the control electrodes of said output transistors, said coupling means including a two-terminal primary winding and first and second two-terminal secondary windings, a reference polarity terminal of said primary winding being responsively connected to the output of said drive means to raise and lower the potential of said reference terminal in response to signals applied to said timing input terminal, the second terminal of said primary winding being connected to said output terminal, a reference polarity terminal of said first secondary winding being connected to the control electrode of said first output transistor, the second terminal of said first secondary winding being connected to said first input terminal, a reference polarity terminal of said second secondary winding being connected to said output terminal, and the second terminal of said second secondary winding being connected to the control electrode of said second output transistor.

6. The device recited in claim 5 and further comprising: a first diode connected in a forward conducting direction from said output terminal to said first input terminal; and a second diode connected in a forward conducting direction from said second input terminal to said output terminal.

7. An electrical control circuit for delivering electrical energy to one terminal of a multiphase A.-C. load from a D.-C. source comprising: first and second D.-C. input terminals adapted to be connected, respectively, to the positive and negative terminals of a D.-C. source; a timing input terminal, adapted to be connected to one output terminal of a polyphase signal source; an output terminal, adapted to be connected to one terminal of a polyphase load; a first output transistor, including a control electrode, having one of an emitter and collector electrodes connected to said first input terminal and the other of said emitter and collector electrodes connected to said output terminal; a second output transistor, including a control electrode, having one of an emitter and collector electrodes connected to said output terminal and the other of said last named emitter and collector electrodes connected to said second input terminal; a transformer coupling means including a two-terminal primary winding and first and second two-terminal secondary windings; a first drive transistor, including a control electrode, having one of an emitter and collector electrodes connected to the reference polarity terminal of said primary winding and the other of said electrodes connected to said first input terminal; a second drive transistor, including a control electrode, having one of an emitter and collector electrodes connected to said reference polarity terminal of said primary winding and the other of said last mentioned electrodes connected to said second input terminal; the control electrodes of said output transistors being operatively connected in phase opposition to said secondary windings, a reference polarity terminal of said first secondary winding being connected to the control electrode of said first output transistor, the second terminal of said first secondary winding being connected to said first input terminal, a reference polarity terminal of said second secondary winding being connected to said output terminal, and the second terminal of said secondary winding being connected to the control electrode of said second output transistor; the second terminal of said primary winding being connected to said output terminal; the control electrodes of said drive transistors being operatively connected in phase opposition to receive signals from said timing input terminal; a first zener diode, connected in the forward conducting direction from the control electrode of said first drive transistor to said first input terminal; and a second zener diode, connected in the forward conducting direction from the control electrode of said second drive transistor to the reference polarity terminal of said primary winding.

8. A circuit as recited in claim 7 and further comprising: a driving amplifier connected by its input to said timing input terminal; second transformer coupling means connected between the output of said amplifier and the control electrodes of said driving transistors, said last named coupling means including a pair of two-terminal second windings, the first of said last named secondary windings being connected to apply control signals to the control electrode of said first driving transistor, the second of said last named secondary windings being connected to apply control signals to the control electrode of said second driving transistor in phase opposition to the signal applied to said first driving transistor.

9. A control circuit adapted to apply single phase A.-C. energy to one phase of a multiphase load from a D.-C. energy source comprising: first and second input terminals adapted to be connected to a source of D.-C. voltage; an output terminal adapted to be connected to one terminal of a polyphase electrical load; a first output transistor, including a control electrode, connected in a forward conducting direction from said first input terminal to said output terminal; a second output transistor, including a control electrode, connected in a forward conducting direction from said output terminal to said second input terminal; a first diode connected in a forward conducting direction from said output terminal to said first input terminal; a second diode connected in a forward conducting direction from said second input terminal to said output terminal; first transformer coupling means, including a two terminal primary winding and a pair of two terminal second windings, said first secondary winding being connected to apply a voltage of a first phase between the control electrode of said first output transistor and said first input terminal, the second said secondary winding being connected to apply a voltage opposite in phase with said first voltage between said control electrode of said second output transistor and said output terminal; a first driving transistor, including a control electrode, connected in a forwarding conducting direction from said first input terminal to a reference polarity terminal of said primary winding; a second driving transistor, including a control electrode, connected in a forward conducting direction from said reference polarity terminal of said primary winding to said second input terminal; second coupling means, including second transformer means, connected by its input to said timing input terminal and having a second pair of secondary windings connected to apply voltages in phase opposition to the control electrodes of said driving transistors; a first zener diode connected in a forward conducting direction from the control electrode of said first driving transistor to said first input terminal; the second zener diode connected in a forward conducting direction from the control electrode of said second driving transistor to the reference polarity terminal of the said primary winding of said first transformer coupling means.

References Cited in the file of this patent

UNITED STATES PATENTS

| | | |
|---|---|---|
| 2,821,639 | Bright et al. | Jan. 28, 1958 |
| 2,872,582 | Norton | Feb. 3, 1959 |
| 2,912,634 | Peoples | Nov. 10, 1959 |
| 2,972,710 | D'Amico | Feb. 21, 1961 |